UNITED STATES PATENT OFFICE.

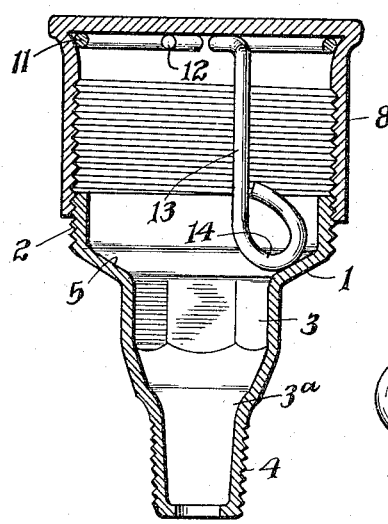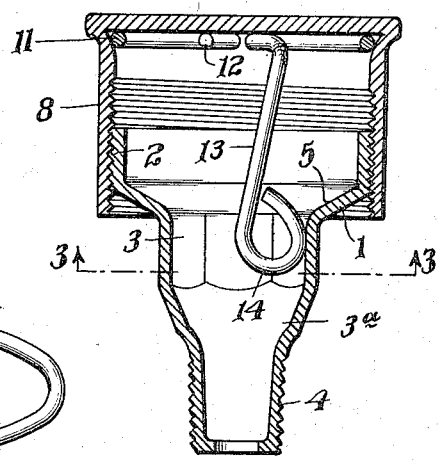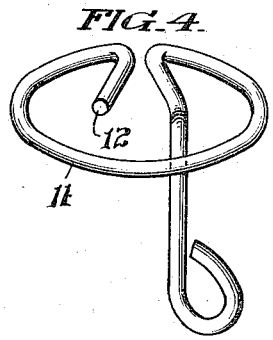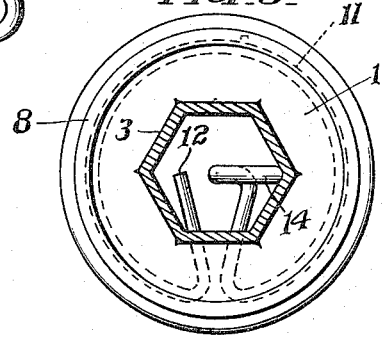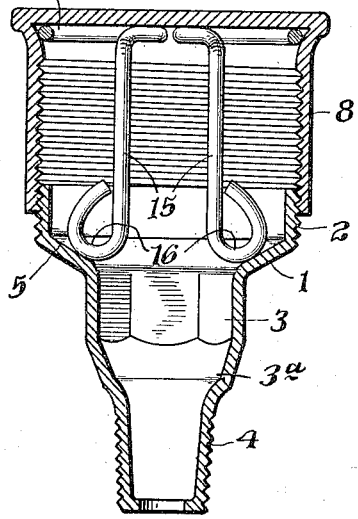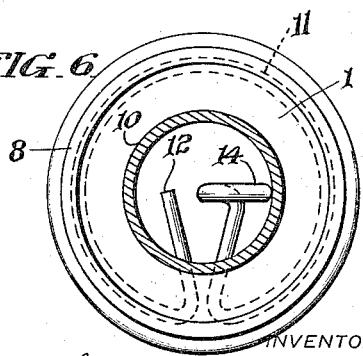

RAY G. KISSINGER, OF CAMDEN, NEW JERSEY.

LOCKING DEVICE FOR GREASE-CUPS.

1,149,268.                    Specification of Letters Patent.    Patented Aug. 10, 1915.

Application filed September 2, 1913.   Serial No. 787,589.

*To all whom it may concern:*

Be it known that I, RAY G. KISSINGER, a citizen of the United States, and a resident of Camden, county of Camden, State of New Jersey, have invented certain new and useful Improvements in Locking Devices for Grease-Cups, of which the following is a specification.

My invention relates to improvements in locking devices for grease cups of the character comprising a portion which is adapted to be secured to the part to be lubricated and a detachable cap for such portion.

One of the objects of my invention is to provide an improved locking device which is secured to and carried upon the cap member of the grease cup and which is provided with means which is adapted to engage frictionally the interior of the base portion thereof to prevent accidental separation of the cap from such portion.

A further object of my invention is to so relate the locking device to the parts comprising the cup that it does not interfere in any way with the initial connection between the two members of the cup when it is desired to connect them.

Heretofore, as far as I am aware, locking devices of the character to which my invention relates have been of such a nature and have borne such relation to the parts of the cup structure that they have interfered with the ready initial connection of the two members. It is an important feature of my invention that this objection has been obviated.

A further purpose of my invention is to simplify the construction while at the same time maintaining efficiency of action.

Other objects and advantages of my invention will be referred to hereinafter or will be apparent from the detailed description thereof.

In the accompanying drawings I have illustrated convenient forms of embodiment of my invention but it will be understood that changes in the details of construction may be made within the scope of the claims without departing therefrom.

In the drawings:—Figure 1 is a longitudinal central section of a grease cup provided with my invention; Fig. 2 is a similar view with the parts in somewhat different relation with respect to each other; Fig. 3 is a transverse section on the line 3—3 of Fig. 2; Fig. 4 is a perspective view of the spring locking device illustrated in Figs. 1, 2 and 3; Fig. 5 is a longitudinal sectional view of a grease cup provided with a modified construction of spring locking device embodying my invention; and Fig. 6 is a transverse sectional view taken in the same relative position with respect to the cup as Fig. 3 but showing a modified construction of cup provided with a spring locking device such as is shown in Figs. 1 to 4 inclusive.

Referring to Figs. 1, 2, 3 and 5 of the drawings, 1 designates the base portion of a grease cup provided with a flanged screw-threaded portion 2 and also with a polygonal shaped portion 3 which provides means to be engaged by a wrench for engaging and disengaging the reduced screw-threaded end portion 4 with a tapped hole formed in the part to be lubricated. Intermediate the polygonal portion 3 and the screw-threaded portion 2 there is an inverted truncated cone-shaped portion 5 which is the portion of the base of the cup with which the spring locking device first contacts, as will be hereinafter set forth.

8 designates the grease cup cap provided with interior screw-threads which are adapted to engage with the externally screw-threaded part 2 upon the base 1 of the cup.

The parts 1 and 8 may be constructed by pressing from sheet metal or otherwise, as may be desired.

The construction of grease cup shown in Fig. 6 is identical with that shown in the preceding figures of the drawing and the same reference numerals may be applied thereto with the exception of the intermediate portion corresponding to the polygonal portion 3 which in said Fig. 6 is round or circular in cross-section, as indicated at 10.

Referring to Figs. 1, 2, 3, 4 and 6, the locking device consists of a wire spring including a portion 11, illustrated as being substantially circular but which may be of any other shape preferred, which is seated against the bottom of the cap, as shown in the drawings, in the angle between the bottom and side walls.

The ends of the spring are extended horizontally and divergently in a general radial direction into the interior of the cup adjacent to the inner side of the bottom of the cap 8. One of the ends terminates at the point 12 as shown. The other end is extended downwardly and somewhat laterally, as shown at 13 in Fig. 1 of the drawings, and is provided at its extreme lower end with a bend constituting an eye or loop 14. It is to be noted at this point, however, that my invention is not limited to a construction having a bend or loop of this character, but the end of the wire may terminate in any manner desired. The length or height of the part 13 and its bend or loop is such that when it is desired to connect the cap 8 with the base portion 1 of the cup one or two turns of the cap 8, after its connection with the screw-threaded portion 2 of the base 1, may be made before the lower end of the portion 13 contacts with the inclined inner surface of the portion 5 of the base 1. This is a very desirable arrangement and relation because it facilitates the placing of the cap 8 upon the base 1 of the cup. After the lower end of the part 13 of the locking spring is forced firmly into contact with the inclined interior surface of the part 5 the friction is sufficient to prevent accidental turning in a reverse direction of the cap 8 to remove the same from the part 1. As the cap is screwed farther and farther down upon the screw-threaded part 2 of the base 1 the lower end of the part 13 of the locking spring is caused to move inwardly as indicated in Fig. 2 of the drawing and to enter the region within the polygonal portion 3 of the base 1. When in such position it bears firmly against the sides of such polygonal portion and by reason of the friction between the end of the spring and such sides prevents accidental turning of the cap in either direction.

As already indicated, the construction shown in Fig. 6 is identical with that shown in Figs. 1, 2, 3 and 4 with the exception of the fact that the portion 10 thereof corresponding to the polygonal portion 3 in Figs. 1, 2 and 3 is circular in cross-section. The friction, however, between the interior surface of this circular portion and the lower end of the portion 13 of the spring locking device is sufficient to prevent accidental disengagement and separation of the cap from the base part 1 of the cup.

I will now refer again to Fig. 5 in which a modified construction of spring locking device is shown. In this figure the spring locking device consists of a spring wire bent so as to form a circular portion 11 as in the preceding figures, the opposite end portions of which are extended horizontally and divergently in a general radial direction toward the central portion of the interior of the cap 8 adjacent to the bottom of the same. Both ends of the wire are then extended downwardly as shown at 15 and are provided at their ends with bends forming loops 16. The parts 15 may terminate otherwise as may be desired.

In the construction shown in Fig. 5, as in the previous constructions, the cap 8 is connected to the base 1 by a turn or two before the lower ends of the parts 15 of the spring contact with the downwardly inclined interior surfaces of the part 5 of the base 1 of the cup. After the ends of these parts have been caused to bear firmly against the inclined interior surface of the part 5, the friction is sufficient to prevent accidental disengagement of the cap 8 from the screw-threaded part 2 of the base 1. Upon the further downward movement of the cap 8 with respect to the base 1 of the cup the lower ends of the parts 15 enter the space within the polygonal portion 3 and contact with more or less force, depending upon the size and tension of the spring, against the interior surface of the portion 3 at opposite points.

In the form of construction illustrated in Figs. 1, 2, 3, 4 and 6, the single downwardly depending portion 13 with its bend or loop 14 which extends into and contacts with the interior surfaces of portions of the base 1 of the cup, stirs up and prevents the "callousing" of the grease so that it is maintained in such condition that it will be supplied through the outlet at the lower end of the base 1 to the parts to be lubricated. There is little or no tendency of the part 13 and its bend or loop 14 to cause an upward movement of the grease in the base 1.

When the cap 8 is provided with the construction of locking spring shown in Fig. 5 and is rotated the two downwardly extending portions 15 and their bends or loops 16 coöperate to cause a tendency of the grease in the base portion 1 of the cup to move upward. As a result of such tendency of upward movement the portion of the said cup within the region of the polygonal portion 3 and below that region to a point within the region indicated by the reference numeral 3ª may be cleaned and freed of grease. One result of the tendency of the grease in the cup to move upward is that any dirt or foreign matter which may find its way into the cup is lifted to the top of the grease and may be removed and is thereby prevented from passing out of the cup on to the parts to be lubricated. Notwithstanding the tendency of upward movement of the grease the pressure exerted thereon by the cap 8 may be relied on to effect a discharge of sufficient grease for lubricating purposes.

I claim:—

1. A grease cup comprising base and cap members, one of the said members having a locking device secured thereon, the said locking device consisting of a circular spring portion seated in the said member and having one of its ends extended inwardly of said member and longitudinally thereof into position to engage the interior surface of the other of said members when they are connected together.

2. A grease cup comprising base and cap members and having a locking device consisting of a spring member having a circular portion secured in the cap member, the said device having an end extended inwardly and transversely of said cap member and longitudinally thereof toward its open end and being adapted to engage the interior surface of the base member when the said base and cap members are connected together.

3. A grease cup comprising base and cap members, the said cap member being adapted to have screw-threaded connection with the said base member and a spring acting locking device having a circular portion seated in the angle between the sides and bottom of the said cap member and having one end extended transversely of said cap member and longitudinally of the said cup and being in engagement with the interior of the said base member when the two members are secured together.

4. A grease cup comprising base and cap members which are adapted to be secured together by a screw-threaded connection, whereby the said members may be adjusted toward and from each other, and a locking device consisting of a wire spring having a circular portion seated in the cap member in the angle formed between the sides and the bottom of the cap member and having a portion extended radially within the said cap member and then extended longitudinally thereof, the end of which is adapted to engage with different portions of the interior surface of the said base member and to thereby prevent accidental disengagement of the said members.

5. A grease cup comprising base and cup members having adjustable engagement with each other and a locking device consisting of a wire spring member having a portion secured within the cap and having its end portions extended horizontally inwardly of said cup and then longitudinally thereof in general parallel relation with respect to each other, the ends of the said extended portions being adapted to contact at opposite points with the interior surface of the said base member.

6. As an article of manufacture, a spring lock to prevent accidental disengagement of the members of a grease cup, the said lock consisting of a spring wire having a circularly shaped portion and an end portion extended radially of the said circular portion and then at an angle transverse to the plane of the said circular portion, substantially as described.

7. A grease cup comprising base and cap members and having a locking device provided with a circular spring portion adapted to be held in the cap by its spring action, the said portion having an extension one part of which extends transversely of the cup and another part longitudinally thereof, the latter part projecting into the base member and contacting against the same for the purpose stated.

In testimony that I claim the foregoing as my invention, I have hereunto signed my name this 30th day of August, A. D. 1913.

RAY G. KISSINGER.

In the presence of—
HORACE D. REEVE,
CYRUS N. ANDERSON.

Copies of this patent may be obtained for five cents each, by addressing the "Commissioner of Patents. Washington, D. C."